United States Patent [19]

Riley

[11] Patent Number: 4,986,454

[45] Date of Patent: Jan. 22, 1991

[54] PORTABLE DISPENSER FOR VISCOUS MATERIAL

[75] Inventor: Martyn F. Riley, Newcastle-upon-Tyne, England

[73] Assignee: Eaton Hall Design Workshops Limited, Cheshire, England

[21] Appl. No.: 354,774

[22] Filed: May 22, 1989

[30] Foreign Application Priority Data

May 20, 1988 [GB] United Kingdom ................. 8812039

[51] Int. Cl.[5] .......................... B05B 11/02; F16H 3/44

[52] U.S. Cl. .................................... 222/327; 74/89.17; 192/93 R; 222/333; 222/390

[58] Field of Search ................ 222/326, 327, 333, 386, 222/390; 74/89.17, 422; 192/93 R, 93 B, 93 C, 82 P

[56] References Cited

U.S. PATENT DOCUMENTS

| | | | |
|---|---|---|---|
| Re. 26,180 | 4/1967 | Frenzel et al. | 222/333 x |
| 3,635,378 | 1/1972 | DeHart | 222/333 |
| 3,799,407 | 3/1974 | Loethen et al. | 222/333 |
| 3,854,629 | 12/1974 | Blieberger | 222/333 X |
| 3,913,799 | 10/1975 | Davis Jr. | 222/333 X |
| 3,985,273 | 10/1976 | Davis Jr. | 222/333 X |
| 4,180,187 | 12/1979 | Ben-Haim | 222/333 X |
| 4,583,934 | 4/1986 | Hata et al. | 222/327 X |
| 4,615,469 | 10/1986 | Kishi et al. | 222/327 |
| 4,704,913 | 11/1987 | Zimmer | 74/89.17 |

*Primary Examiner*—Kevin P. Shaver

*Attorney, Agent, or Firm*—Shapiro and Shapiro

[57] ABSTRACT

The invention relates to a manually held dispenser for dispensing flowable material such as a mastic sealant from a cartridge, comprising a plunger for forcing material from the cartridge on actuation of an electric motor drive to move the plunger by a rack and pinion in a direction to dispense sealant from the cartridge. When it is desired to replace a spent cartridge, the pinion is disengaged fromt he rack and the plunger can then be withdrawn or retracted to a starting positon in a direction opposite to the one direction.

16 Claims, 5 Drawing Sheets

PORTABLE DISPENSER FOR VISCOUS MATERIAL

The invention relates to a dispenser for viscous material, particularly a mastic-type material which is used in caulking or sealing.

Present manual dispensers are heavy and thus not very portable. Moreover, they are cumbersome to use in that a user has to hold them, aim them and dispense manually, using both hands in what in total amounts to a cumbersome operation. This leads to operator fatique, inefficient operation and hence often a messy job, with caulk or sealant being incorrectly applied in the wrong target area, for example when sealing along the edge of a bath.

It is accordingly an object of the invention to mitigate these disadvantages.

According to the invention there is provided a dispenser for dispensing a viscous material from a cartridge, comprising a manual holder for the cartridge and a plunger, for forcing material from the cartridge on actuation of the plunger characterized by a motor drive for actuating the plunger to move in one direction to dispense material and by means to disengage the motor drive and plunger whereby manual return of the plunger in a direction opposite to the one direction can be effected.

The motor drive may comprise an electric motor. This provides for a relatively simple yet efficient drive for the plunger.

The plunger may comprise a rack and the motor drive may comprise a pinion which engages the rack for moving same in the one direction. A rack and pinion drive such as this provides a relatively simple yet positive drive.

The motor may be driven by battery means housed in a handgrip of the holder. This provides a compact dispenser device.

There may be a protection device overlying the rack to protect ingress of foreign matter into the teeth thereof. This arrangement helps to obviate jamming of the dispenser.

The protective device may comprise a flexible strip of substantially the same width as the rack, for example a flexible metal strip, such as strip steel, suitably stainless.

The disengaging means may comprise a part of the holder which may carry the pinion and which may be hinged to a further part of the holder. This provides for a relatively simple device whereby when the one part is pivoted away from the other about the hinge, the pinion is lifted off the rack.

Alternatively, there may be a manual clutch device operable to disengage the rack and pinion.

The motor may be adapted to release pressure in the one direction at the termination of a dispensing stroke. This has the effect that sealant is prevented from oozing out of a cartridge in use, after a dispensing step has been terminated.

It will be understood that the invention extends to a dispenser as hereinbefore defined, including a cartridge.

Dispensers embodying the invention are hereinafter described, by way of example, with reference to the accompanying drawings.

In the drawings, like parts are referred to by like reference numerals.

Figure 1:
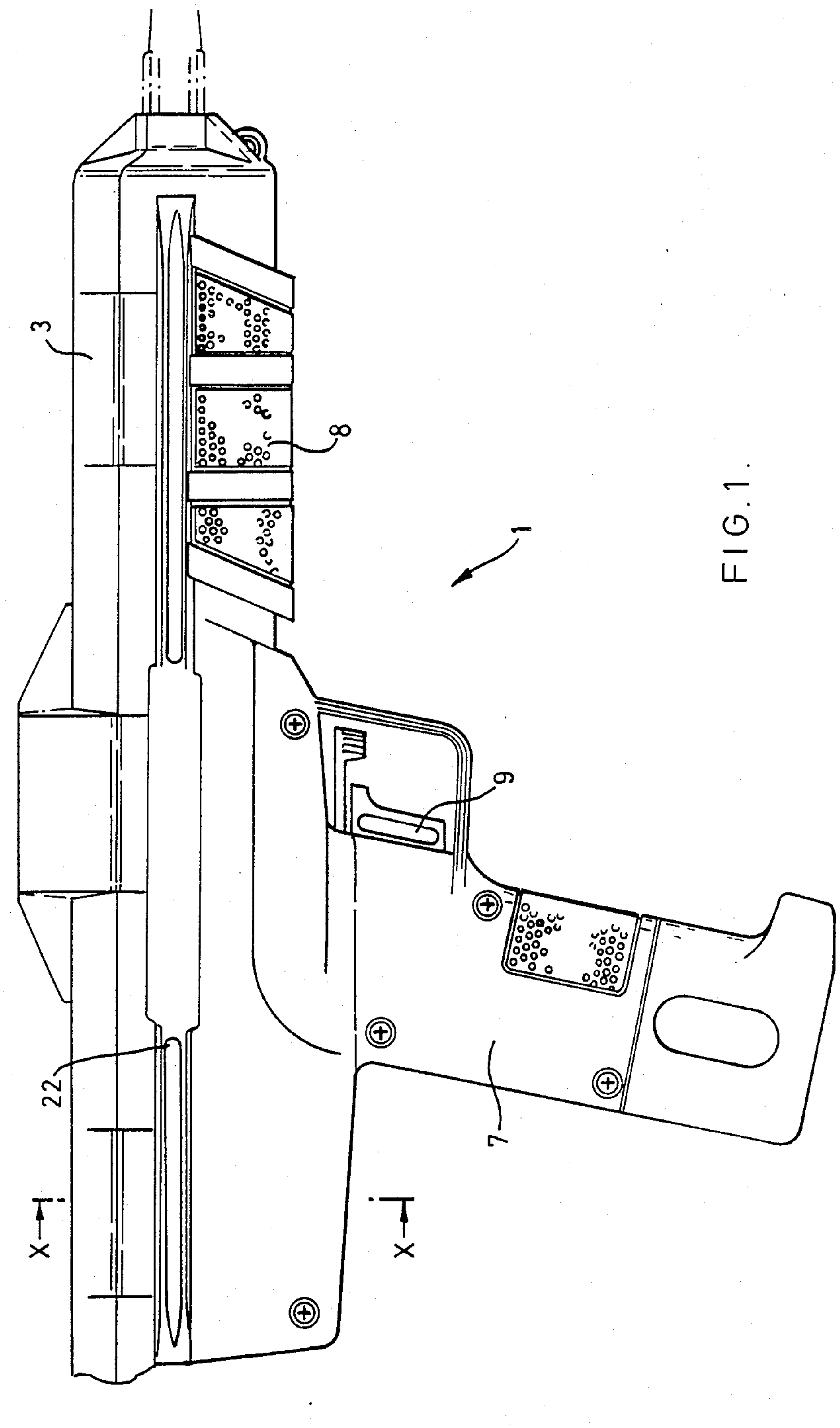
FIG. 1 is a side elevational view of a first dispenser according to the invention, for dispensing viscous material such as a mastic sealant from a disposable cartridge.
Figure 2:
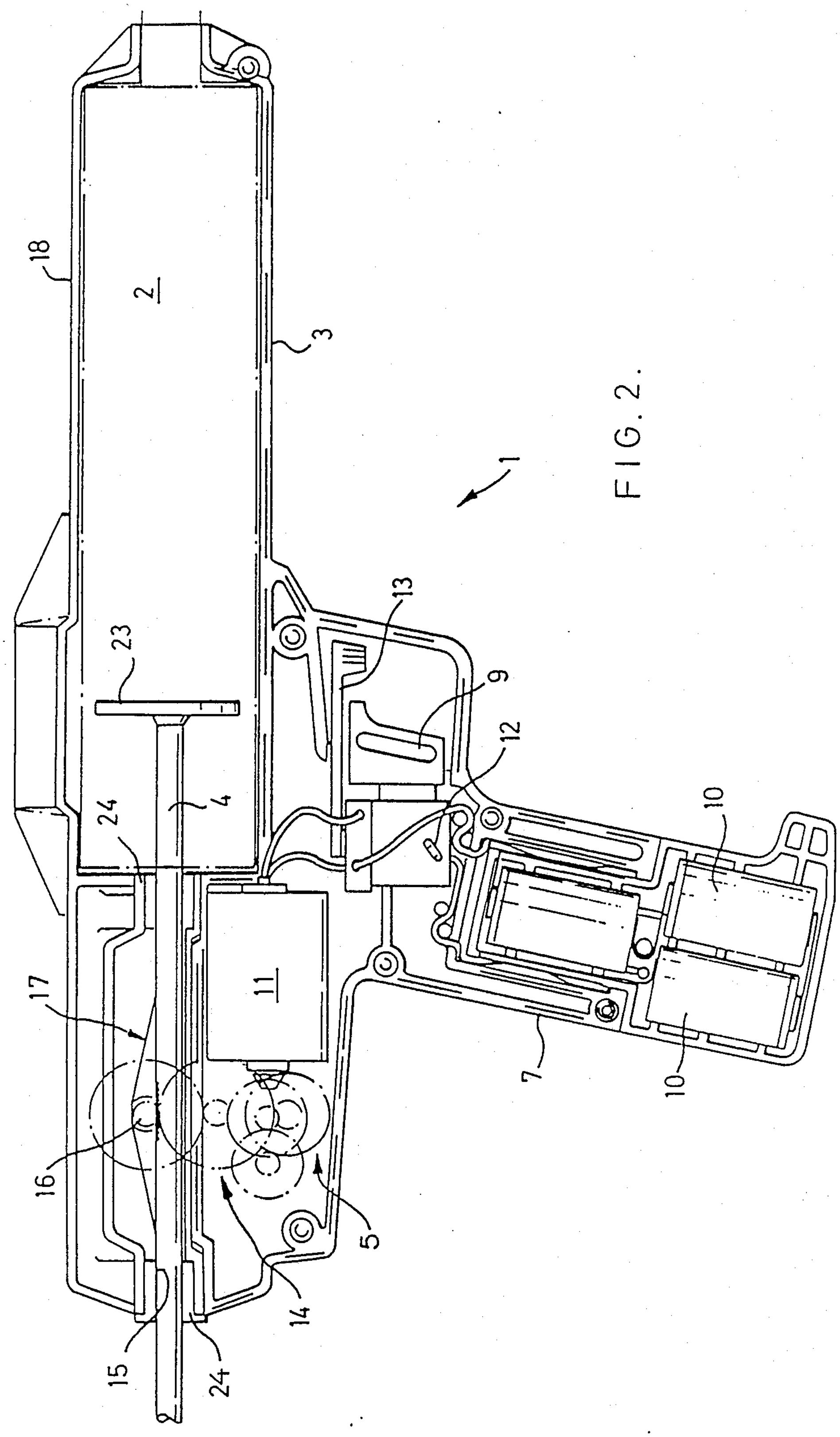
FIG. 2 is a longitudinal sectional view of the dispenser of FIG. 1.
Figure 3:
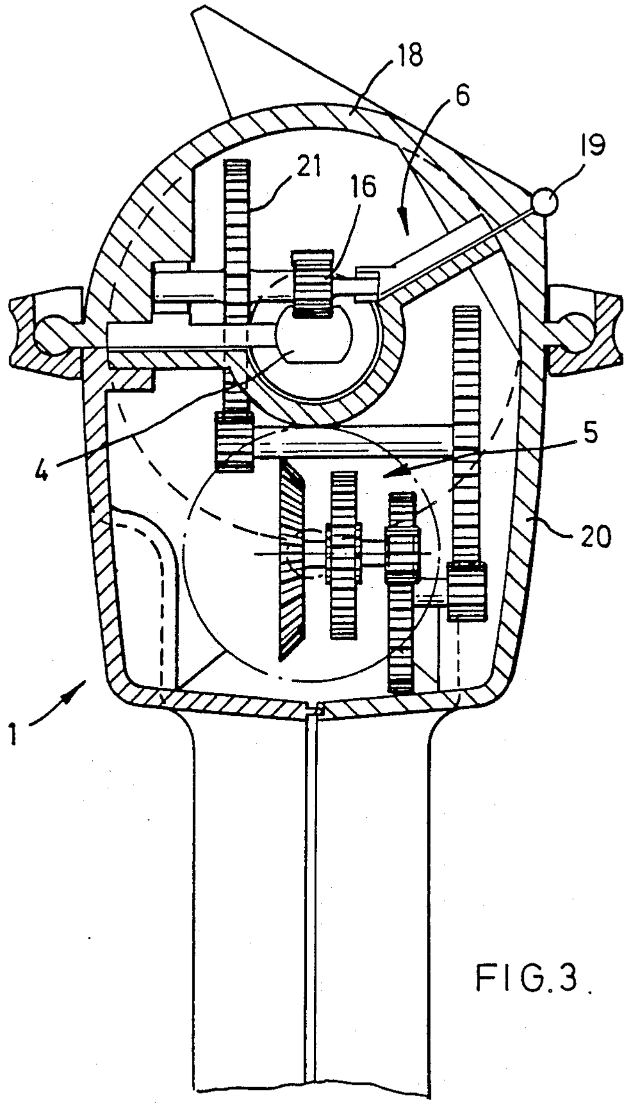
FIG. 3 is a transverse sectional view of the dispenser of FIG. 1, taken on line X—X of FIG. 1.

Referring to FIGS. 1–3 of the drawings, there is shown a dispenser 1 for dispensing a viscous material such as a mastic sealant from a cartridge 2 (FIG. 2), suitably a disposable cartridge, comprising a manual holder, the cartridge being held in a chamber 3, a plunger 4 for forcing material from the cartridge 2 on actuation of the plunger 4, a motor-and-gear drive device 5 for actuating the plunger 4 to move in one direction to dispense material, and means 6 (FIG. 3) to disengage the drive 5 and plunger 4, whereby manual return of the plunger 4 in a direction opposite to the one direction can be effected.

The dispenser 1 shown is suitable for dispensing or extruding a sealant or any other product contained in standard 5 cm×22 cm or 25 cm long cartridges.

The dispenser 1 has two holding points in the form of a handle 7 and a barrel grip 8 and is operated by means of a trigger switch 9. A removable, replaceable battery is inserted in the lower portion (as viewed) of the handle, for example secondary cells 10, suitably three in the present embodiment. The cells 10 provide a direct electric current to a motor 11 via a plunger switch 12 and a reversible speed control switch 13. Mechanical power is then transmitted via a compact gear train 14 to a final drive consisting of a rack 15 and pinion 16. The rack 15 is guarded against contamination by foreign particles by means of a strip of material 17 which passes over the top of the pinion, inside the device 1. The reduction through the gears is on the oder of 1024:1.

In order that cartridge 2 may be received in the chamber 3 of the dispenser 1, the dispenser has a body having an upper (as viewed) body part 18 which is hinged as indicated diagrammatically at 19 (FIG. 3), to a lower body part 20, which upper part 18 carries the plunger 4 which itself carries the rack 15, and a final gear 21 carrying the pinion 16 so that when the upper part 18 is pivoted away from the lower part 20, the drive to the rack 15 is disengaged and the plunger 4 can be returned to an initial starting position (to the left in FIGS. 1, 2) to facilitate the insertion of a fresh cartridge and the initiation of fresh dispensing operations. The two parts 18, 20 of the dispenser are held together in the closed position by a push bar lock 22, which is pushed forward (to the right as viewed) to open the chamber 3 for ejection of a used or spent cartridge 2.

In use, with a full cartridge 2 loaded in the chamber 3, the plunger 4 withdrawn to the left as viewed and suitable batteries 10 in the handgrip, when it is desired to extrude sealant in the cartridge, the trigger 9 is operated to start the motor 11, which in turn operates the gear train 14 and thus gear 21 to turn the pinion 16 which acts on the rack 15 to drive the piston 4 in one direction (to the right as viewed), the dispensing direction, so that a buffer, nose or plate 23 on the one end bears on the cartridge 2 to compress same and to extrude sealant from a nozzle.

To replace a spent cartridge 2, the chamber 3 is opened as described above, and the plunger 4 is withdrawn manually in the opposite direction to the one direction (to the left as viewed) as the rack 15 and pinion 16 are disengaged. The plunger 4 slides in mounting blocks 24 having bores of complementary shape.

The motor 11 may be of variable speed, and reversible via switch 13 so that at the end of a stroke to extrude sealant, depressurization is facilitated after each extrusion operation so that the mastic material is prevented from oozing out of the nozzle. The reversible speed control switch 13 for the motor is incorporated to initiate such depressurization.

There is a protective device shrouding the rack in the form of the flexible metal strip 17 secured as the rivets at each end to the piston 4 and overlying same, the strip 17 being of substantially the same width as the rack 15. The metal strip 17 passes over the pinion 16 and as the piston 4 moves in either the one direction or the opposite, the strip 17 bows or rises up over the pinion 16, returning at either side thereof to lie on the rack so that the ingress of foreign material such as dirt is prevented.

Figure 4:
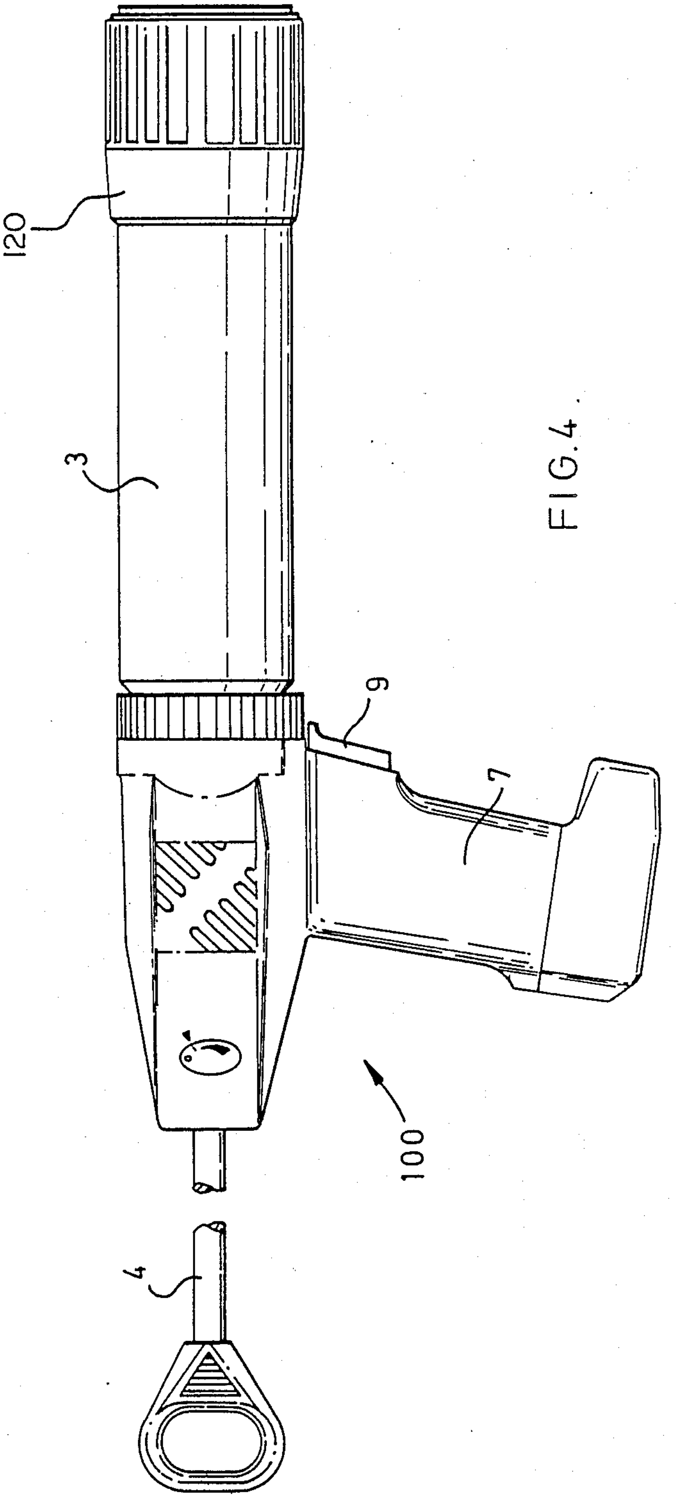
FIG. 4 is a side elevational view of a second embodiment of the dispenser according to the invention, for the same purpose as that of FIG. 1.
Figure 5:
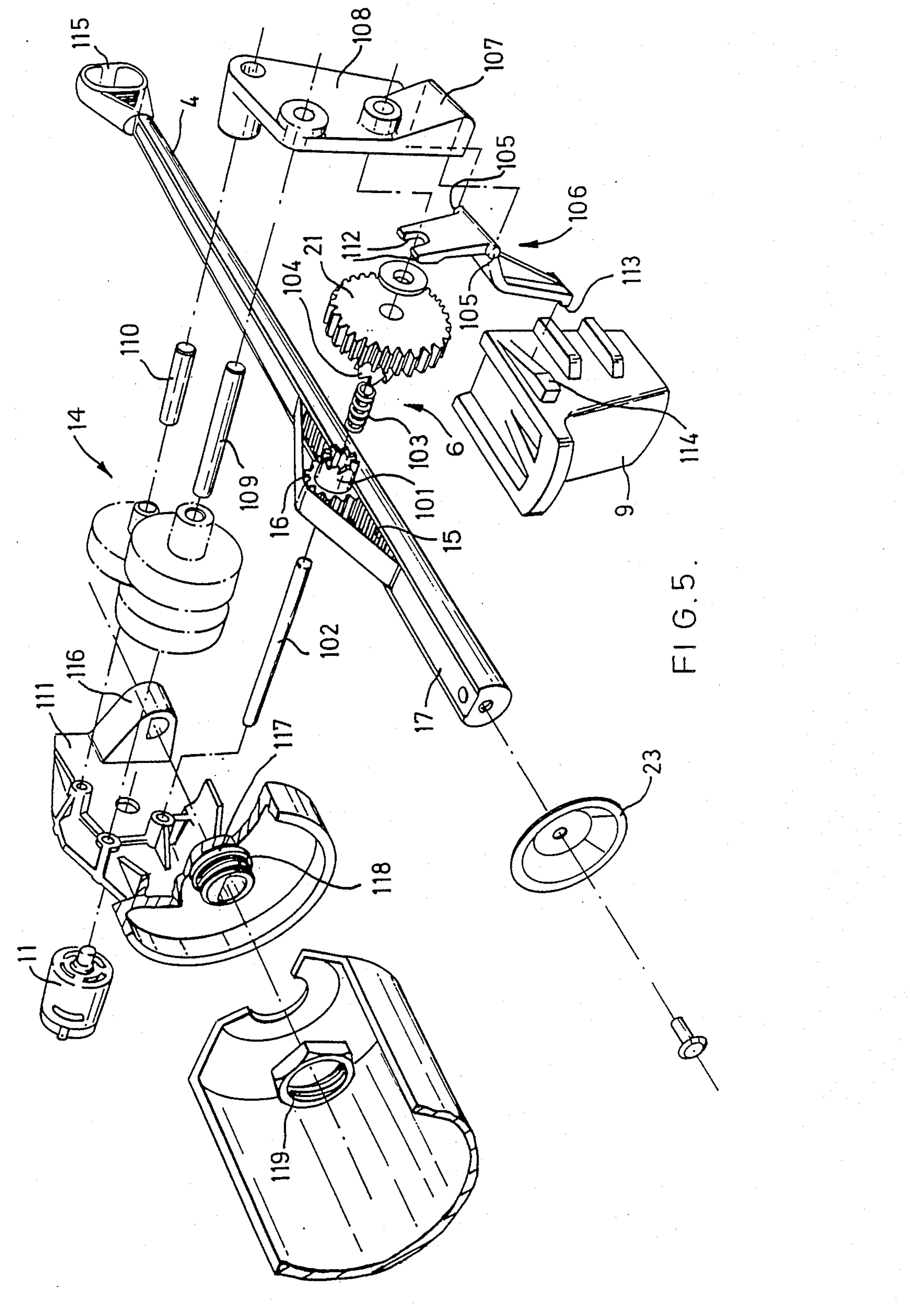
FIG. 5 is an exploded perspective view of the dispenser of FIG. 4.

Referring now to the embodiment shown in FIGS. 4 and 5, a dispenser 100 is similar to the first embodiment in that it has a plunger 4 which is driven by a battery operated electric motor through suitable gearing 14 in one direction (to the right in FIG. 4) to dispense sealant from a cartridge. The plunger 4 again has a circular cross-section with a chordal slice removed to provide a flat (in use) upper surface which is in the form of a rack 15 that is protected by a flexible metal strip 17 secured to the plunger 4 at opposite ends and overlying a pinion 16 engaging the teeth of the rack 15. Again, too, the plunger 4 is withdrawn manually to allow replacement of a spent cartridge with a fully charged one. The manual retraction of the plunger 4 is allowed by a disengagement means 6 which comprises a toothed clutch part 101 on the pinion 16 mounted on an axle 102 on which there is also a coil spring 103. The spring 103 is between the toothed clutch part 101 and a second toothed clutch part 104 carried axially by a final drive gear 21 of the gear train 14 through which the motor 11 operates to drive the rack 15 in the one direction.

There is a toggle or wish-bone kind of device 106 which has intermediate bosses 105 mounted for pivoting in a lug 107 of a carrier 108 which has mounting trunnions for the end of the axle 102, and for axles 109, 110 which carry other gears of the gear train 14, one of which is driven by the motor 11. There is a similar opposite carrier 111 to make a composite unit. One end of the toggle device 106 has flat bearing surfaces 112 which bear on the gear wheel 21. The other end has an inclined cam follower surface 113 which is in sliding engagement with a wedge-shaped or inclined cam surface 114 carried on the side of a trigger switch 9 of the dispenser 1, the switch 9 being operable to start the motor 11 to drive the rack 15. In an inoperative position, the trigger 9 projects to its maximum extent so that the two surfaces 113 and 114 are virtually disengaged. In this position, the spring 103 acts to push the gear 21 to the right as viewed, so that the clutch parts 101 and 104 are disengaged. This in turn causes the device 106 to be pivoted to the right about the bosses 105. If now it is desired to extrude sealant through the nozzle 115, the trigger 9 is squeezed or depressed. This action forces the cam surface 114 towards the cam follower 113 so that the free space between the lower part of the device 106 and the trigger 9 is effectively lessened as the cam incline "increases". This would lead normally to jamming but this does not occur because the sliding camming movement is accommodated by the cam 114 pushing the lower part to the right (as viewed). This action causes the device 106 to pivot counterclockwise about its bosses 105 so that the upper part, being integral, pivots to the left (as viewed). This movement is sufficient to overcome the pressure of the spring 103 so that the clutch parts 101, 104 engage and the pinion 16 is driven to act on the rack 15 to drive the plunger 4 in the one, dispensing, direction.

When it is desired to cease dispensing sealant, the trigger 9 is released. This causes it to move to its initial position under spring (not shown) pressure, so moving the inclined surfaces 113, 114 apart. The pressure on the spring 103 is thus released, so it moves the clutch parts 101, 104 apart so they are disengaged, and this in turn pivots the device 106 clockwise (as viewed) to the starting position. The plunger can then be retracted manually using a handgrip 115, and a used or spent cartridge can be removed and replaced.

The batteries are housed in the handgrip 7 as before.

The plunger piston 4 passes through complementarily shaped bearing bosses or parts 116, 117 in the dispenser body, there being a screw thread 118 on the forward boss 117 through which the plunger 4 projects and to which the chamber 3 for the cartridge is secured by a nut 119, the buffer 23 being on the side of the nut 119 remote from the gears tiding 14. The chamber 3 is cylindrical and has a screw nozzle 120 on the distal end which is removable so that cartridges can be mounted in and removed from the dispenser.

The second embodiment is thus similar to the first, but the act of engaging and disengaging the drive to the rack is accomplished by simply operating the trigger 9.

I claim:

1. A portable dispenser for dispensing viscous material, comprising a dispenser body having a holder portion configured to receive a cartridge of viscous material to be dispensed, displaceable plunger means supported in said dispenser boy for displacement in a dispensing direction to force the viscous material from the cartridge, said plunger means having a rack which is driven by a pinion to displace said plunger means in said dispensing direction, and motor-driven gear train means disposed in said dispenser body for driving said pinion to effect said displacement of said plunger means, said dispenser body including an upper body portion carrying said plunger means and said pinion and a lower body portion carrying at least part of said gear train, said upper body portion being hingedly connected to said lower body portion such that said dispenser body may be opened to uncoupled said pinion from said part of said gear train carried by said lower body portion to permit manual displacement of said plunger means in a direction opposite to said dispensing direction and such that said dispenser body may be closed to couple said pinion to said part of said gear train carried by said lower body portion to enable driving said plunger means in said dispensing direction through said gear train.

2. A dispenser as defined in claim 1, further comprising a hand grip housing battery means of powering the drive motor for said gear train.

3. A dispenser as defined in claim 1, further comprising protective means overlying said rack to prevent ingress of foreign matter into teeth of said rack.

4. A dispenser as defined in claim 3, wherein said protective means comprises a flexible strip of substantially the same width as said rack and secured to said plunger means.

5. a dispenser as defined in claim 4, wherein said strip is a flexible metal strip.

6. A dispenser as defined in claim 1, wherein the drive motor for said gear train is operable to relieve pressure of said plunger means on the viscous material at the termination of a dispensing stroke of said plunger means.

7. A portable dispenser for dispensing viscous material, comprising a dispenser body having a holder portion configured to receive a cartridge of viscous material to be dispensed, displaceable plunger means supported in said dispenser body for displacement in a dispensing direction to force the viscous material from the cartridge, said plunger means having a rack which is driven by a pinion to displace said plunger means in said dispensing direction, motor-driven gear train means disposed in said dispenser body for driving said pinion to effect said displacement of said plunger means, and means for coupling said pinion to said gear train to enable driving said plunger means in said dispensing direction and for uncoupling said pinion from said gear train to permit manual displacement of said plunger means in a direction opposite to said dispensing direction, said coupling and uncoupling means including a first clutch member drivingly connected to said pinion and a second clutch member drivingly connected to said gear train and displaceable relative to said first clutch member into and out of driving engagement with said first clutch member, squeeze actuated trigger switch means for actuating the drive motor for said gear train, and means cooperable with said trigger switch means to force said clutch members into engagement upon squeezing of said trigger switch means and for disengaging said clutch members upon release of said trigger switch means.

8. A dispenser as defined in claim 7, wherein said trigger switch means includes a cam portion, and said means cooperable with said trigger switch means includes spring means for biasing said clutch members to a disengaged state and toggle means cooperable with said cam portion, said toggle means pivoting to force said clutch members into engagement in opposition to the bias of said spring means when said trigger switch means is squeezed and reversely pivoting under the bias of said spring means to allow said clutch members to disengage when said trigger switch means is released.

9. A dispenser as defined in claim 8, wherein said first clutch member is integral with said pinion and said second clutch member is integral with a gear of said gear train.

10. A dispenser as defined in cliam 9, wherein said pinion and said gear of said gear train are supported on a common rotary shaft.

11. A dispenser as defined in claim 10, wherein said gear of said gear train is displaceable toward and away from said pinion along said shaft.

12. A dispenser as defined in claim 7, further comprising a hand grip housing battery means for powering the drive motor for said gear train.

13. A dispenser as defined in claim 1, further comprising protective means overlying said rack to prevent ingress of foregin matter into teeth of said rack.

14. A dispenser as defined in claim 13, wherein said protective means comprises a flexible strip of substantially the same width as said rack and secured to said plunger means.

15. A dispenser as defined in claim 14, wherein said strip is a flexible metal strip.

16. A dispenser as defined in claim 7, wherein the drive motor for said gear train is operable to relieve pressure of said plunger means on the viscous material at the termination of a dispensign stroke of said plunger means.

* * * * *